(No Model.)
J. GOULD, Jr.
CAN OPENER.
No. 539,261.
Patented May 14, 1895.
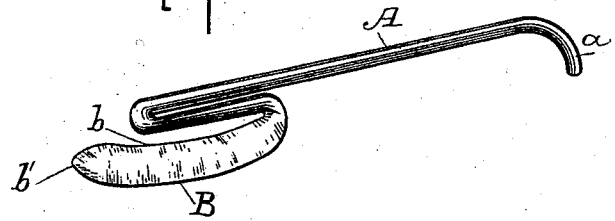
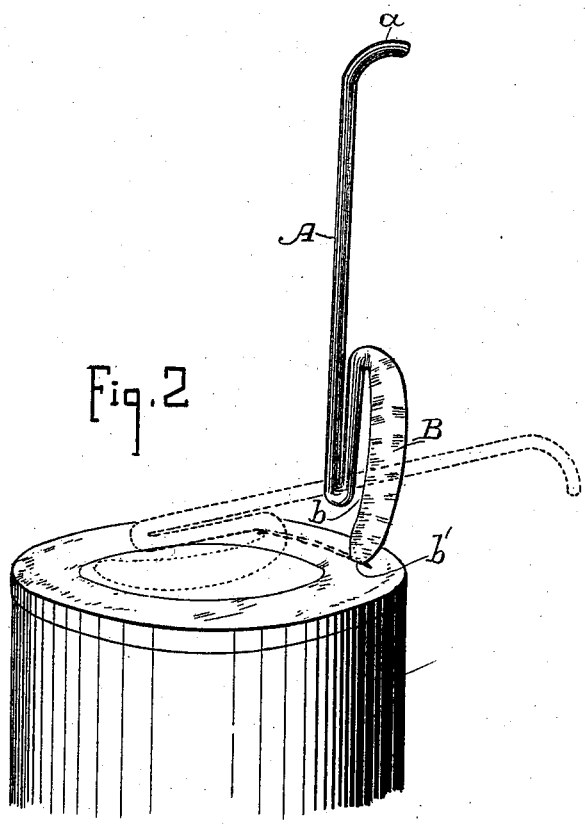
Witnesses:
Inventor,
James Gould Jr
By Duvey & Co.
Attys

UNITED STATES PATENT OFFICE.

JAMES GOULD, JR., OF BERKELEY, CALIFORNIA.

CAN-OPENER.

SPECIFICATION forming part of Letters Patent No. 539,261, dated May 14, 1895.

Application filed March 6, 1895. Serial No. 540,765. (No model.)

*To all whom it may concern:*

Be it known that I, JAMES GOULD, Jr., a citizen of the United States, residing at Berkeley, Alameda county, State of California, have invented an Improvement in Can-Openers; and I hereby declare the following to be a full, clear, and exact description of the same.

My invention relates to that class of can openers, in which a handled wire or bar has its other end provided or formed with a cutting hook adapted to penetrate the material of the can, and when entered to present its cutting edge in such a manner that upon vibrating or working the handle, the cutting hook will be caused to move through the tin and to cut said tin as it moves.

My invention consists in a hook having its inner side reduced to a cutting edge, said hook springing from the wire or bar at a point back of the latter's extremity, and thence extending approximately parallel therewith to and beyond said extremity.

The object of my invention is to provide a simple and practicable can opener, adapted to be readily entered into and through the material of the can, and to be turned at once to a position in which, by the vibration of its handle or shank, it can be advanced quickly and certainly in its cutting path around the can, thereby opening it.

Referring to the accompanying drawings for a more complete explanation of my invention, Figure 1 is a perspective view of my can-opener. Fig. 2 is a view showing the opener about to be entered in a can, and the dotted lines showing its progress.

The wire or bar A which forms the shank of the tool has, at one end, a suitable bend or curve $a$ serving as a handle or adapted to receive a suitable handle. From the other end of the shank, at a point well back of its extremity, springs the hook B, the inner side of which at $b$, is reduced to a cutting edge all the way back to its crotch, and said edge extends approximately parallel with but separated from the extremity of the shank and projects beyond it. The extremity of the hook is also reduced to a cutting edge or point, as shown at $b'$ whereby it is adapted to readily enter through the material of the can. This hook may spring directly from the shank of the tool, or when made of a wire or bar, it may project from the returned or bent extremity of said shank as I have here shown, so that the entire thing, in this case, is formed of one bar or piece of wire. The under surface of the shank extremity or its returned or bent portion which lies opposite the cutting edge of the hook, forms a fulcrum in the operation of the tool, and this surface may be more or less flattened or otherwise shaped as may be desired.

The tool may be used in opening any kind of a can, so that there need be no expense attendant upon the manufacture of a can, especially for use with this opener; and said opener may be used on the top of the can or the side of the can as may be desired. In using it, it is first placed with its sharpened extremity $b'$ upon the can at the point where it is desired to enter it, and by a sharp blow or pressure upon its handled end, said extremity is driven into and through the tin, and as soon as it is entered, the shank is brought down toward a horizontal position, in which position the device bears upon the can at two points, namely, first, at its sharpened crotch at the base of its hook, which bears directly in the cut of the tin, and, second, upon the under side of the extremity of its shank. With the latter point now as a fulcrum, the shank is pulled up, whereby the sharpened cutting edge of the hook in drawing out and upwardly from the can, severs the tin until the shank has reached approximately a vertical position. Thereupon the tool is returned to an inclined position, approximating a horizontal, and pushed forwardly, so that it takes a fresh position similar to its first position, and then upon a second rise of the handle it turns about its new point of fulcrum, and the cutting edge of the hook again severs the tin, and so on.

I am aware that there are can openers in which a cutting hook is provided or formed with the extremity of a handled shank, but in all the devices of this character of which I am aware, the hook springs from and points backwardly from the extremity of the handle or shank, thereby differing from my hook which springs from a point back of the extremity and extends forwardly, thereby providing for the advancement of the hook before the hand of the operator, instead of following after it, as is the case where the hook springs backwardly from the extremity.

Having thus described my invention, what I claim as new, and desire to secure by Letters Patent, is—

A can opener consisting of a bar or wire forming a shank, the extremity of which is bent backwardly parallel with and upon itself, and is then flattened and formed into a forwardly projecting hook having its inner edge reduced to a cutting edge, and its extremity projecting beyond the extremity of the shank and reduced to a cutting point.

In witness whereof I have hereunto set my hand.

JAMES GOULD, JR.

Witnesses:
S. H. NOURSE,
J. H. BAYLESS.